July 28, 1925.
A. H. RANKIN ET AL
EMERGENCY AXLE
Filed Nov. 2, 1922
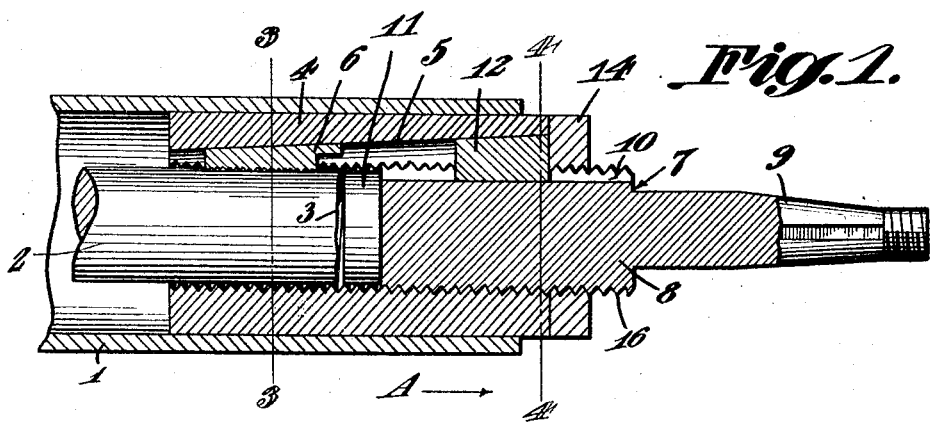
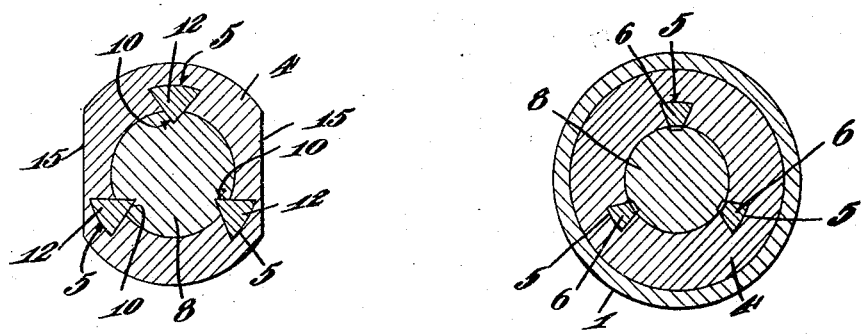
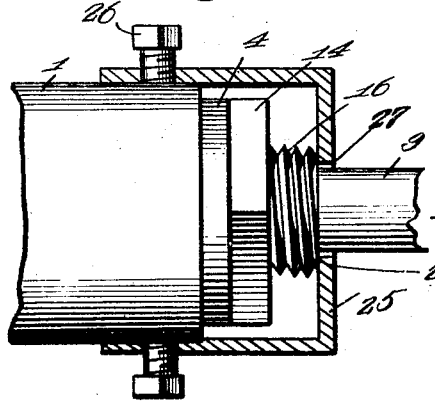
A. H. Rankin and R. L. Coe, Inventors Patented July 28, 1925.

1,547,444

UNITED STATES PATENT OFFICE.

AUSTIN H. RANKIN AND ROLLA L. COE, OF STOY, ILLINOIS.

EMERGENCY AXLE.

Application filed November 2, 1922. Serial No. 598,547.

*To all whom it may concern:*

Be it known that we, AUSTIN H. RANKIN and ROLLA L. COE, citizens of the United States, residing at Stoy, in the county of Crawford, State of Illinois, have invented a new and useful Emergency Axle, of which the following is a specification.

This invention aims to provide a simple means whereby a wheel may be mounted on a broken axle of an automobile.

In the drawings, Figure 1 is a longitudinal section wherein parts appear in elevation; Figure 2 is a side elevation, parts being broken away, and the cap being shown as an added detail; Figure 3 is a cross section on the line 3—3 of Figure 1; Figure 4 is a cross section on the line 4—4 of Figure 1.

The numeral 1 marks the axle housing of an automobile. The axle is denoted by the numeral 2. Suppose that the axle 2 is broken as indicated at 3. Then a cylindrical casing 4 is inserted into the housing 1 about the axle 2. The casing 4 has internal, longitudinal, undercut guideways 5. Roughened wedge-shaped grips 6 are advanced in the guideways 5 of the casing 4 until the grips engage with the axle 2.

The numeral 7 marks an axle extension comprising a body 8 and a reduced spindle 9. The body 8 of the axle extension has external keyways 10. The body 8 of the axle extension 7 is threaded at 16 into the casing 4. If necessary, a filler 11 may be interposed between the inner end of the body 8 of the axle extension and the broken end 3 of the axle 2. When the axle extension 7 is rotated and advanced in the casing 4, the extension and the filler 11 if the latter be used, press against the axle 2 and cause the casing 4 to move outwardly in the direction of the arrow A in Figure 1. When the casing 4 moves in the direction of the arrow A, the grips 6 are bound tightly on the broken axle 2. Thus, the casing 4 is connected to the axle 2, for rotation therewith. The axle extension 7 is rotated until the keyways 10 therein line up with the guideways 5 in the casing 4. Then the keys 12 are inserted longitudinally into the keyways 10 and into the guideways 5. The keys 12 serve to connect the axle extension 7 with the casing 4, for rotation therewith. A lock nut 14 is threaded on the body 8 of the axle extension 7 and retains the keys 12 against longitudinal movement. The casing 4 has parallel surfaces 15 whereby the casing may be held by a wrench against rotation whilst the lock nut 14 is being seated.

After the parts have been arranged as above described, the wheel of the vehicle may be mounted on the spindle 9 of the axle extension 7 in the usual way, it being possible to transmit rotation to the wheel, from the axle 2.

Should it be desired to retain the axle end additionally, in the event that the same is broken, recourse may be had to a cap 25 held by set screws 26 on the axle housing 1 and provided with an opening 27 adapted to receive the axle end and to cooperate with the shoulder 28 on the axle end.

What is claimed is:—

1. In a device of the class described, a casing having a longitudinal guideway; an axle grip slidable in the guideway; an axle extension threaded into the casing and adapted to cooperate with the broken axle to impart longitudinal movement to the casing and to cause the grip to engage the broken axle; a key longitudinally slidable in the guideway and interengaged with the axle extension; and a nut threaded on the extension and constituting a retainer for the key.

2. In a device of the class described, a casing; a wedge-shaped axle grip slidable longitudinally therein; an axle extension threaded into the casing and adapted to cooperate with the broken axle to impart longitudinal movement to the casing and to cause the grip to operate; a key slidable longitudinally in the casing and engaged with the axle extension; and means carried by the extension for retaining the key.

In testimony that we claim the foregoing as our own, we have hereto affixed our signatures in the presence of two witnesses.

AUSTIN H. RANKIN.
ROLLA L. COE.

Witnesses:
EMILY L. BOA,
CARRIE E. BROWN.